June 14, 1927.
E. R. JACOBI
1,632,550
JOINT FOR SPLIT RIMS AND METHOD OF MAKING THE SAME
Filed June 26, 1925
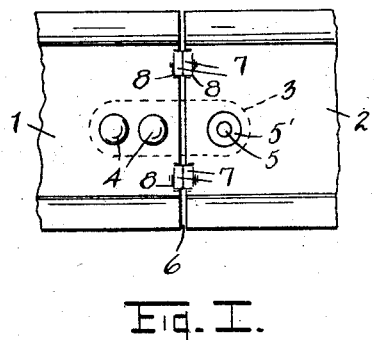
Fig. I.
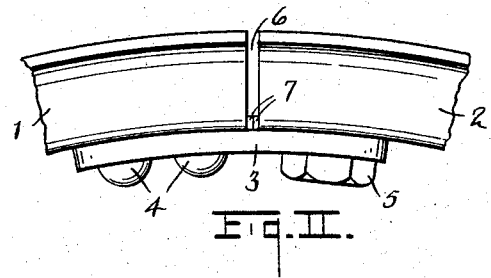
Fig. II.
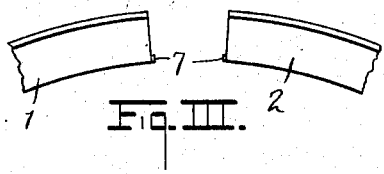
Fig. III.
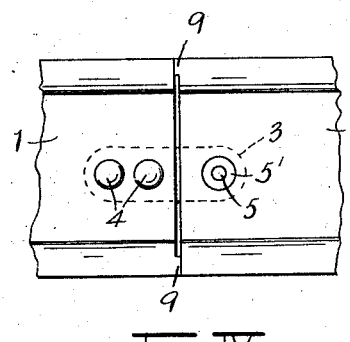
Fig. IV.
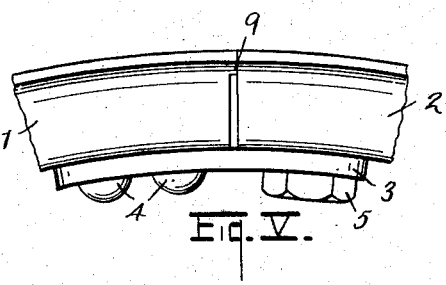
Fig. V.
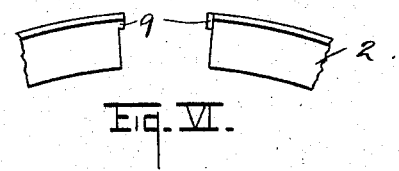
Fig. VI.
Fig. VII.
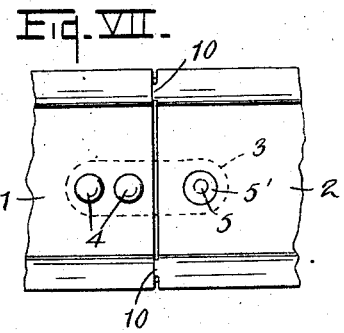
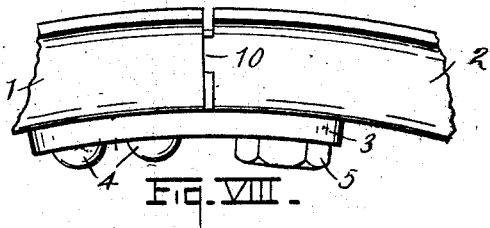
Fig. VIII.
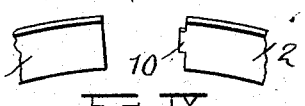
Fig. IX.
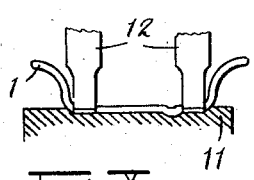
Fig. X.
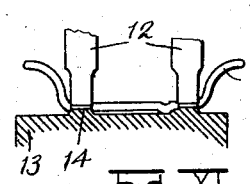
Fig. XI.
INVENTOR
Emil R. Jacobi
BY
ATTORNEYS

Patented June 14, 1927.  1,632,550

UNITED STATES PATENT OFFICE.

EMIL R. JACOBI, OF JACKSON, MICHIGAN, ASSIGNOR TO HAYES WHEEL COMPANY, OF JACKSON, MICHIGAN.

JOINT FOR SPLIT RIMS AND METHOD OF MAKING THE SAME.

Application filed June 26, 1925. Serial No. 39,715.

This invention relates to improvements in joints for the connecting ends of split rims for automobile tires.

The objects of the invention are:

First, to provide an improved joint for a split rim in which an accurate fit is secured between the ends of the rim, eliminating the necessity for close tolerances at that point.

Second, to provide in such a joint a means of accurately fitting the meeting ends of the split rim to take up all slack in the coupling and prevent pivoting or canting of the rim at that point.

Third, to provide an improved method of constructing such joint.

Further objects and objects relating to details and economies of construction and operation will definitely appear from the detailed description to follow.

I accomplish the objects of my invention by the devices and means described in the following specification. The invention is clearly defined and pointed out in the claims. Structures which are preferred embodiments of my invention are fully illustrated in the accompanying drawing, forming a part of this specification, in which:

Fig. I is a plan view of a split rim and joint, from the outside of the rim, in preferred form.

Fig II is a side elevation of the parts appearing in Fig. I.

Fig. III is a detail side elevation view of the meeting ends of the rim in spaced relation.

Fig. IV is a detail view similar to Fig. I, of a modification showing the contacting parts at the extreme outside of the rim flanges.

Fig. V is a side elevation view of the parts appearing in Fig. IV.

Fig. VI is a detail side elevation view of the rim ends illustrated in Figs. IV and V, separated from each other.

Fig. VII is a plan view similar to Fig. I of a still further modification, showing the contacting parts midway of the flanges.

Fig. VIII is a side elevation view of the structure appearing in Fig. VII.

Fig. IX is a detail side elevation view of the separated ends of the rim as illustrated in Figs. VII and VIII.

Fig. X is an elevation view of one of the rim ends in process of manufacture, showing the position of die and punches for forming the same.

Fig. XI is a modification of the structure appearing in Fig. X in which projecting die portions are provided to coact with the punches.

In the drawing similar numerals of reference refer to similar parts throughout the several views. The parts of the drawing will be identified by their numerals of reference. 1 and 2 are the meeting ends of the split rim. 3 is the tie plate or bar, secured by countersunk rivets 4, 4 to the end 1. 5 is the attaching screw threaded into tubular stud 5' riveted to the rim end 2. The rim ends are made with a tolerance, indicated at 6 where it is shown much exaggerated to make the illustration clear. The actual tolerance on a 30 inch wheel is substantially $\frac{1}{32}$ of an inch. It is the object to secure as perfect fit as possible but such variation or tolerance is permissible.

When the rim is assembled, it is held in correct position and alignment by suitable means, and a punch, preferably with a square or angular end co-operating with a suitable opposed die, is struck against the outer surface and indents and upsets the metal from both meeting ends 1 and 2 toward each other, entirely filling the space permitted by the tolerance and making a perfect fit after the rim has thus been completely assembled. The metal is merely upset by the stamping action of the punch. This takes all slack out of the coupling where the stud extends through the tie and rigidly couples the split ends of the rim together, preventing all canting.

In Fig. X, I show the arrangement of die 11 and a pair of punches 12 for doing this work, on the usual weight of metal made use of in such trans-split rims. The die 11 is, of course, secured to the bed of a punch press and a pair of punches 12 is put in the punch holder to co-operate with the die. The die is conformed to receive the projecting beads on the rim which locates the same effectively in position and in alignment to receive the stroke of the punch, which finishes the job by closing upset metal across the tolerance space.

In Fig. XI, I show the preferred means and method for heavy rims in which a projection 14 is on the die 13, corresponding to the end of each punch 12 above, whereby the metal is depressed and upset from both sides, which is very effective on the heavy metal.

The modifications illustrated in Figs. IV, V and VI show the projections at 9 at the outer ends of the flanges of the rims. The modifications in Figs. VII, VIII and IX show the projections 10 midway of the flanges at each side of the rims.

In the modifications shown in Figs. IV, V and VI a single projection is shown on each rim end and in symmetrical relation to the projection opposed. This can be formed by locating the punch so that it does not overlap but comes in proximity to the tolerance space between the ends.

In Figs VII, VIII and IX the projections are shown midway of the flanges, the end 1 being left plain and the projections being both formed on the rim end 2. The projections can be formed symmetrically, but there is a distinct advantage in forming them in the preferred manner illustrated in Figs. I, II and III.

The location in Figs. I II and III permits very readily of the use of a power punch without the necessity of elaborate forming dies for the purpose, and because the punch overlaps the joint, a very small amount of metal only needs to be displaced from each rim end. The joint can thus be formed more readily. The other forms are modifications which may be formed by punch as indicated.

I have thus described my invention in detail. I desire to claim the same specifically as illustrated, and broadly as generally disclosed, and also the method of forming this joint by the use of punch and die methods, as pointed out in the appended claims.

Having thus described my invention, what I claim as new and desire to secure by Letters Patent is:

1. A split rim joint comprising the meeting ends, and a tie bar detachably coupling the same, the metal of said meeting ends being upset at each side of the tie bar from each rim end, forming contacting projections into the space therebetween to tighten the joint.

2. A split rim joint comprising the meeting ends, and a tie bar detachably coupling the same, the metal of said meeting ends being upset at each side of the tie bar, forming contacting projections into the space therebetween to tighten the joint.

3. A split rim joint comprising the meeting ends, and a tie bar detachably coupling the same, the metal of said meeting ends being upset from each rim end forming contacting projections into the space therebetween to tighten the joint.

4. A split rim joint comprising the meeting ends, and a tie bar detachably coupling the same, the metal of said ends being formed with an upset contacting projection.

5. The method of manufacturing a split rim joint comprising coupling the meeting ends together as by a tie bar, and then subjecting the meeting ends of the joint to the stamping action of punch ends at each side of said tie bar to upset the metal and form contacting projections therebetween thus making a close fitting joint.

6. The method of manufacturing a split rim joint comprising coupling the meeting ends together by a tie bar, and then subjecting the metal to the stamping action of a punch to upset the metal and form a contacting projection therebetween.

7. The method of manufacturing a split rim joint comprising coupling the meeting rim joint comprising coupling the meeting ends together, and then subjecting the metal to the stamping action of a punch and die projection to upset the metal and form a contacting projection therebetween thus making a close fitting joint.

In witness whereof I have hereunto set my hand.

EMIL R. JACOBI.